Figure 1:
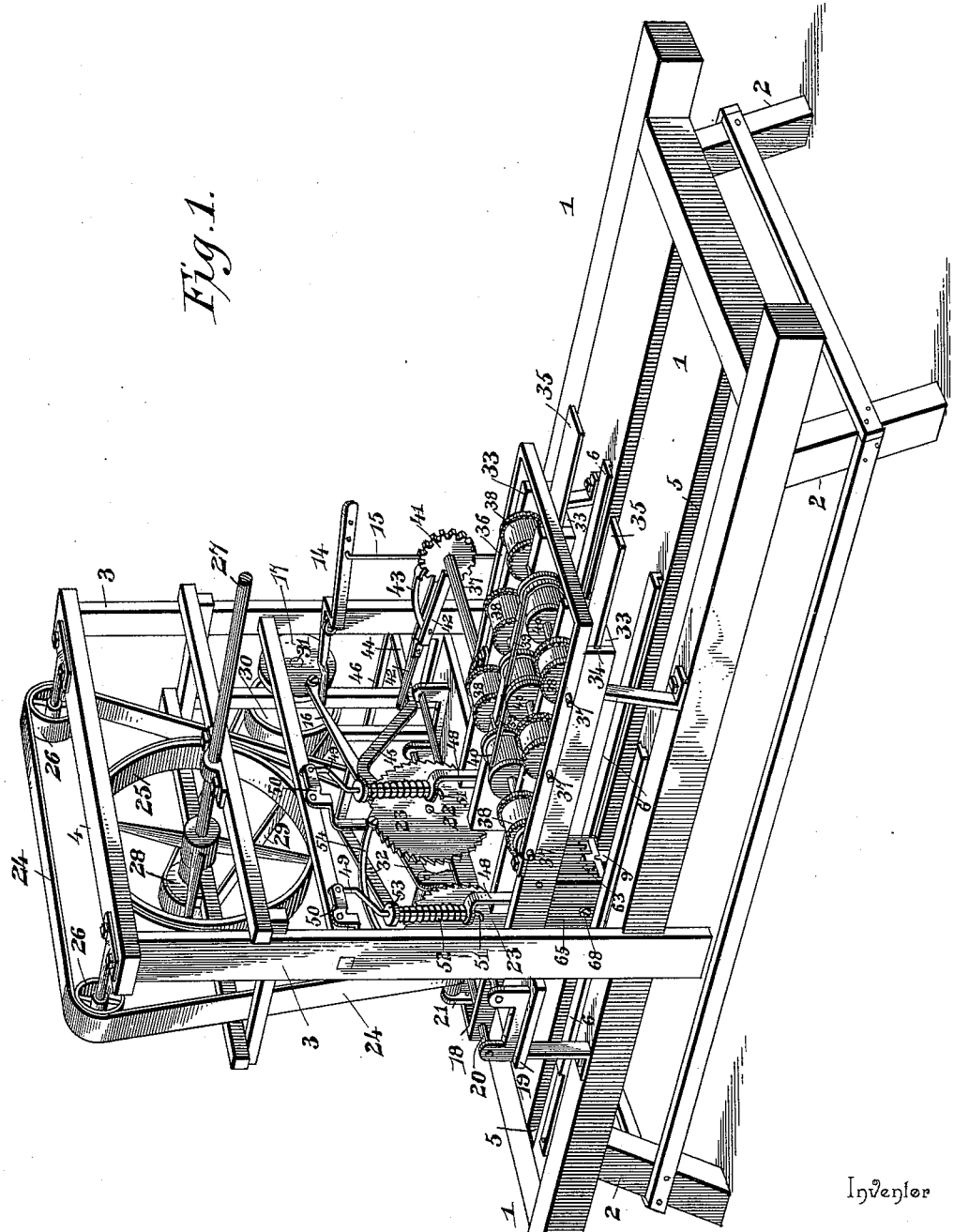

(No Model.) 6 Sheets—Sheet 1.

J. A. BEAMISDERFER.
SPLINT CUTTING AND BUNCHING MACHINE.

No. 596,392. Patented Dec. 28, 1897.

Witnesses
Jas. R. McCathran
V. B. Hillyard.

Inventor
Joseph A. Beamisderfer
By his Attorneys,
C. A. Snow & Co.

(No Model.)

6 Sheets—Sheet 3.

J. A. BEAMISDERFER.
SPLINT CUTTING AND BUNCHING MACHINE.

No. 596,392. Patented Dec. 28, 1897.

Witnesses
Jas. L. McCathran
V. B. Hillyard.

By his Attorneys, C. A. Snow & Co.

Inventor
Joseph A. Beamisderfer

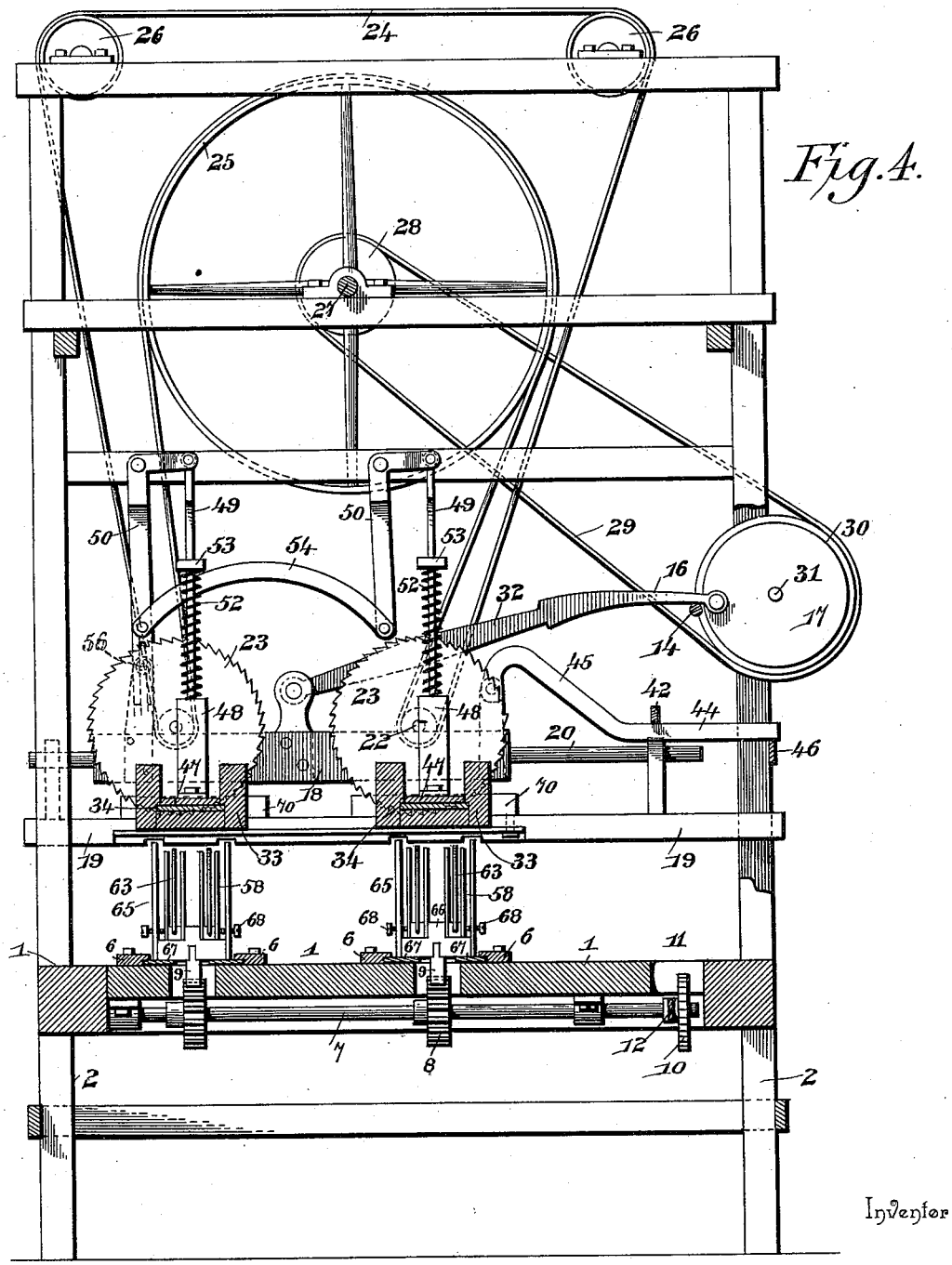

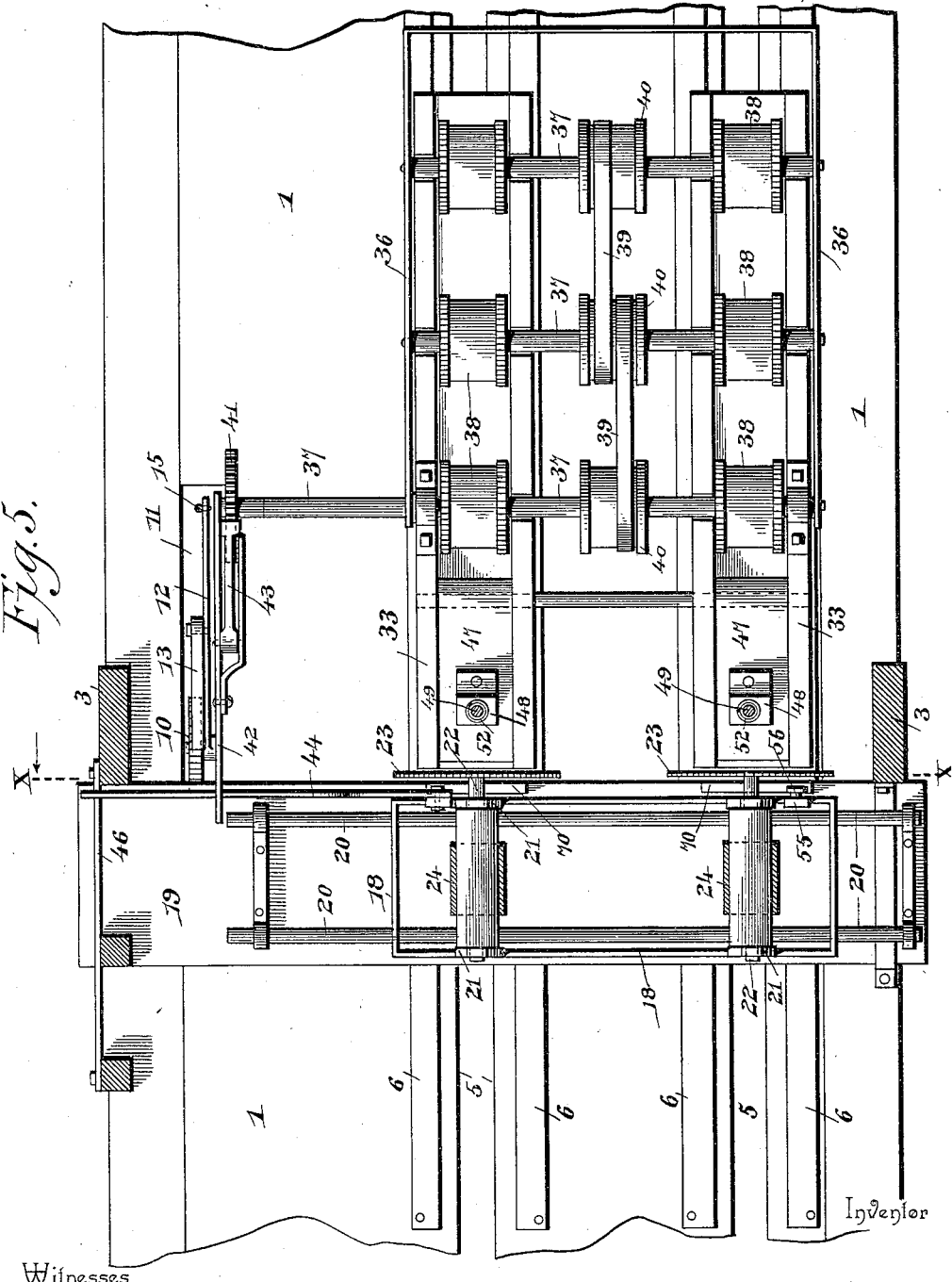

(No Model.) 6 Sheets—Sheet 6.
J. A. BEAMISDERFER.
SPLINT CUTTING AND BUNCHING MACHINE.
No. 596,392. Patented Dec. 28, 1897.
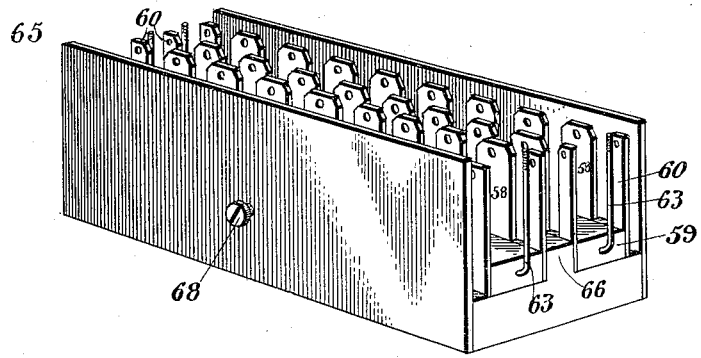
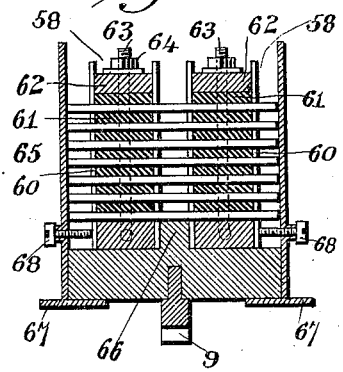
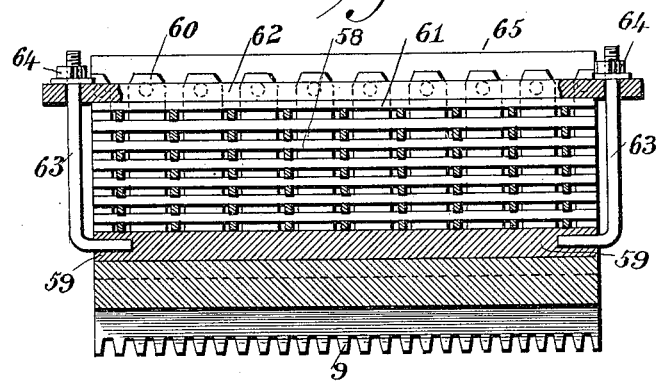
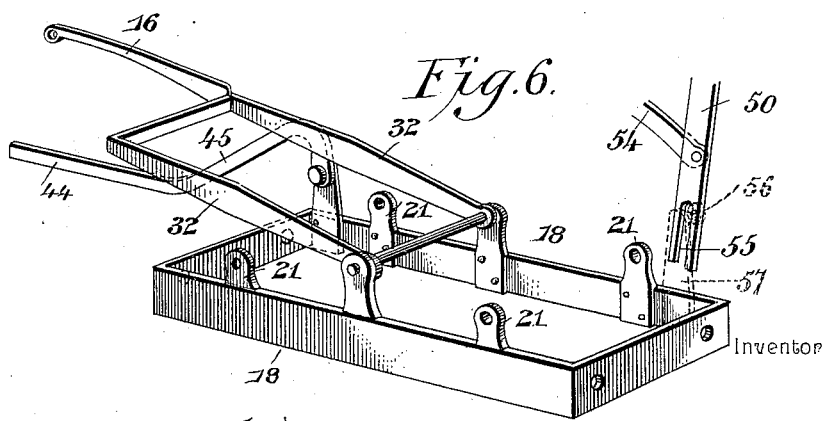
Witnesses
Jas. K. McCathran
U. B. Hillyard
By his Attorneys,
C. A. Snow & Co.
Inventor
Joseph A. Beamisderfer

UNITED STATES PATENT OFFICE.

JOSEPH A. BEAMISDERFER, OF SYNER, PENNSYLVANIA.

SPLINT CUTTING AND BUNCHING MACHINE.

SPECIFICATION forming part of Letters Patent No. 596,392, dated December 28, 1897.

Application filed November 5, 1896. Serial No. 611,162. (No model.)

*To all whom it may concern:*

Be it known that I, JOSEPH A. BEAMISDERFER, a citizen of the United States, residing at Syner, in the county of Lebanon and State of Pennsylvania, have invented a new and useful Splint Cutting and Bunching Machine, of which the following is a specification.

This invention relates to machinery employed in the manufacture of matches, and particularly to that part which forms the match-splints and assembles the splints into bunches to facilitate the subsequent operations of heading and rendering the splints more combustible by applying a coat of paraffin, sulfur, or like substance. By this invention the splints are cut separately from the veneer strips, which are automatically fed to the cutting mechanism, the said splints dropping automatically and by gravity into a holder, in which they are assembled and properly spaced to admit of their heading without the composition binding and uniting the splints, which would be the result if they were not spaced apart a proper distance.

In its organization the machine comprises a carriage bearing a cutting mechanism consisting of a circular saw, means for reciprocating the carriage, a guiding and feeding mechanism for a strip of veneer to advance the latter a distance to bring a portion corresponding to the width of the splint in position to be cut off after the cutter has returned to a starting position, a clamp for securing the veneer strip during the cutting operation and while the cutter is returning to a starting-point, a holder, and mechanism for feeding the holder step by step, so as to receive the splints as soon as they are cut.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 2:
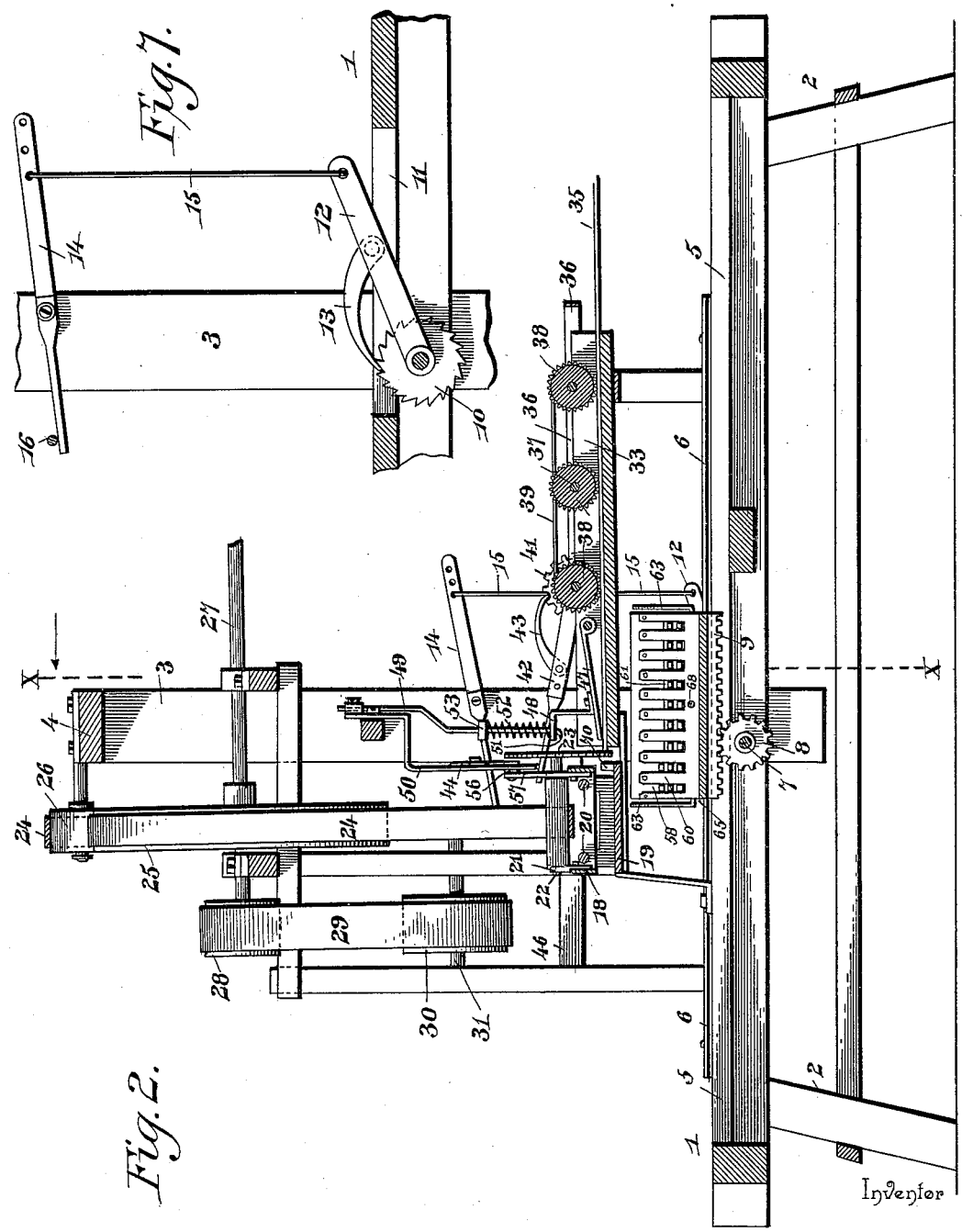
Figure 3:
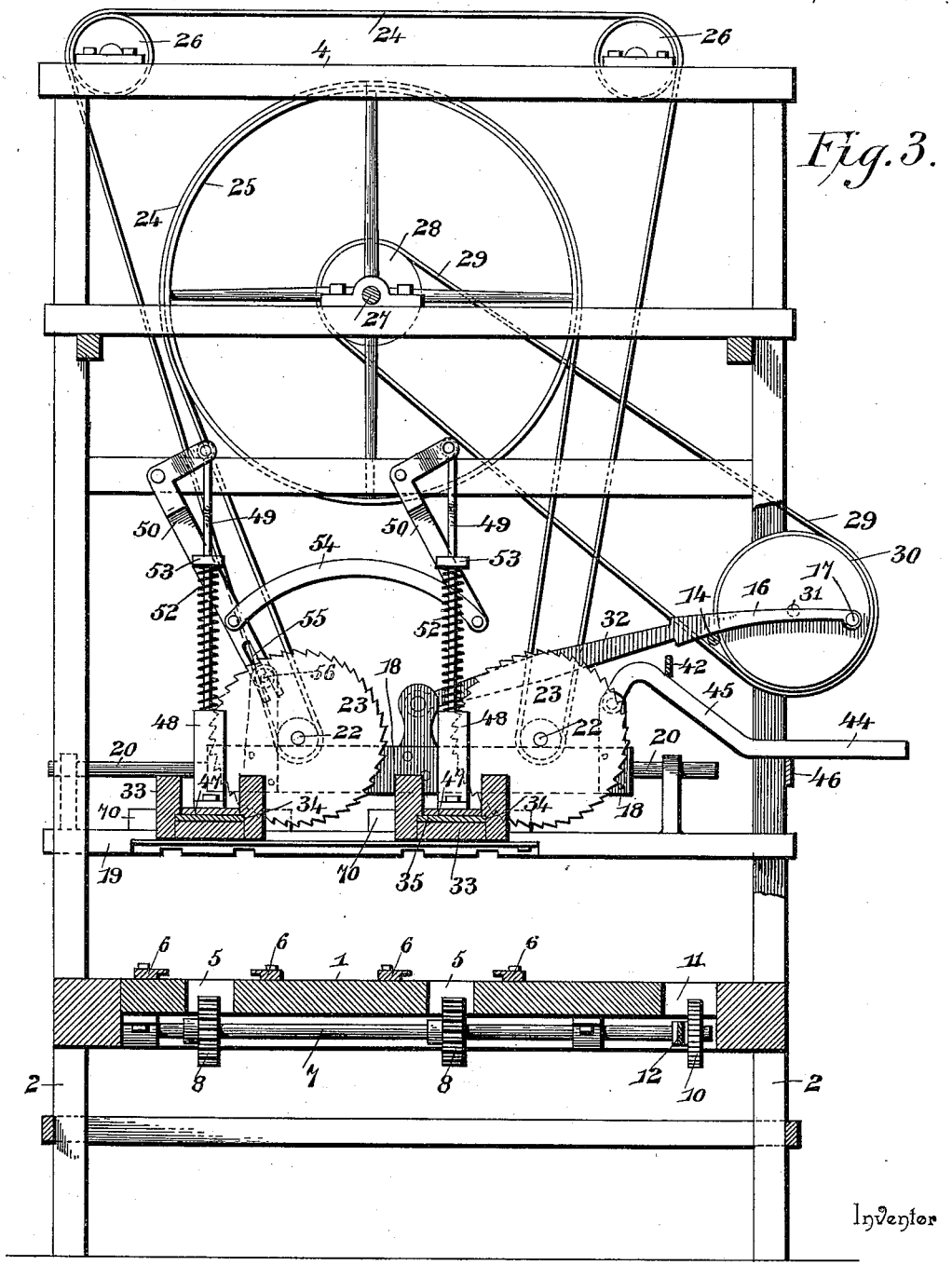

Figure 1 is a perspective view of a machine specially designed for attaining the objects of this invention. Fig. 2 is a longitudinal section thereof. Fig. 3 is a transverse section on the line X X of Figs. 2 and 5. Fig. 4 is a view similar to Fig. 3, showing the splint-holders in position and the parts differently arranged. Fig. 5 is a detail plan view, partly in section, showing the cutting and feeding mechanisms for the strips of veneer. Fig. 6 is a detail view of the carriage bearing the cutting mechanism. Fig. 7 is a detail view of the means for operating the feeding mechanism for the holder. Fig. 8 is a detail perspective view of a splint-holder. Figs. 9 and 10 are respectively a longitudinal and transverse section of the splint-holder.

Corresponding and like parts are referred to in the following description and indicated in the several views of the accompanying drawings by the same reference-characters.

The table 1 is supported upon legs 2 and has uprights 3 at its sides, which are connected at their upper ends by a cross-beam 4 and at intermediate points by cross-bars, which form supports for the operating mechanism. Longitudinal slots 5 are provided in the table, and strips 6 are secured to the top of the table upon opposite sides of the longitudinal slots and form guides to direct the splint-holders in their movement to the splint-cutting mechanism. A shaft 7 is located below the table and is journaled in suitable bearings attached thereto and is provided with pinions 8 to engage with cog-teeth or rack-bars 9 at the lower side of the holders, said cog-teeth or rack-bars operating in the longitudinal slots 5, which afford clearance therefor. A ratchet-wheel 10 is secured to the shaft 7 and operates in an opening 11, formed in the table 1. A lever 12 is loosely mounted upon the shaft 7 and is provided with a pawl 13, having pivotal connection therewith and adapted to engage with the teeth of the ratchet-wheel 10 for turning the latter and the shaft 7 to advance the splint-holders by reason of the pinions 8 meshing with the cog-teeth 9. A lever 14 is pivoted between its ends to an upright 3, and one end is connected by a rod 15 with the lever 12, and its opposite end projects across the path of an arm 16, by means of which motion is transmitted from a crank 17 to the reciprocating carriage 18, bearing the cutting mechanism, so that as said carriage is reciprocated the vertical movement of the outer end of the arm 16 will impart a vibratory movement to the levers 14 and 12 and effect an intermittent movement of the shaft 7 and a corresponding feed of the splint-holders.

A bench 19 is located above the table in the rear of the uprights 3 and is provided with parallel guide-rods 20, upon which is slidingly mounted the carriage 18, the latter being a rectangular-shaped frame having bearings 21, in which are journaled arbors 22, carrying circular saws 23. A pair of arbors 22 are provided and are disposed near the ends of the carriage and are driven by means of a belt 24, which passes around and beneath the arbors, thence over a band-pulley 25 and around direction-pulleys 26. The band-pulley 25 is mounted upon a shaft 27, which is driven in any of the usual ways. A band-pulley 28 is secured upon the shaft 27, and a belt 29 connects it with a companion band-pulley 30 on a shaft 31, which carries the crank 17. The carriage 18 is reciprocated by means of the crank 17 and the arm 16, the latter having a bifurcated portion or comprising parallel members 32, which have pivotal connection with the side bars of the carriage 18 at an intermediate point. The parallel members 32 serve to apply the force equally to the opposite sides of the carriage and prevent binding of the latter upon the guide-rods 20, and that portion of the belt 24 nearer the shaft 31 operates between the said members 32.

Races or chutes 33 are located above the table and their delivery ends terminate about on a level with the bench 19, and the sides of these races or chutes have grooves 34 to receive the edges of the strips of veneer 35 from which the match-splints are formed. A frame 36 has pivotal connection at its inner or rear end with the chutes 33 and has a series of parallel shafts 37, upon which are mounted feed-rollers 38, having milled or toothed edges to engage with the strips 35 and positively advance them to the cutting mechanism. Belts 39 connect band-pulleys 40, secured upon the shafts 37 intermediate of their ends, thereby transmitting motion from one shaft to the others. The inner or rear shaft 37 is extended and a toothed wheel 41 is secured thereto, and a lever 42, loosely mounted upon the said shaft, has a pawl 43, which is adapted to engage with the teeth of the wheel 41 and actuate the latter intermittently, so as to operate the series of feed-rollers for advancing the strips of veneer to the cutting mechanism. The rear end of the lever 42 projects across the path of and is supported by a pivoted arm 44, having a cam portion 45, by means of which the lever 42 is operated for effecting a movement of the veneer-strip-feeding mechanism. This arm 44 is pivoted to the carriage 18 and moves therewith, its outer end being supported upon a plate 46, connecting an upright 3 with the vertical bars to which the shaft 31 is journaled. The frame 36 is adapted to turn upon the inner shaft 37, and the side pieces of the chutes are notched in their upper edges to receive the shafts 37 when the frame is turned to a horizontal position. By having the frame pivoted access can be had to the chutes for removing any obstructing matter and to facilitate the placing of the veneer strips in proper position.

A holder 47 is located at the delivery end of each chute and consists of a plate pivoted at its outer end to the sides of the chute and having its inner end terminating a short distance from the plane of the cutting mechanism. An arm 48 is attached to and rises vertically from each holder or plate 47, and its upper end is bent and apertured to receive the lower end of a rod 49, which is attached at its upper end to the horizontal member of a bell-crank lever 50, which is fulcrumed at the elbow to an intermediate cross-bar connecting the uprights 3. The lower ends of the rods 49 are bent, as shown at 51, so as to engage with the bent ends of the arms 48, so as to elevate the latter at the proper time to release the strips of veneer to permit them being fed to the cutting mechanism. A coil-spring 52 is mounted upon each rod 49 and is confined between the bent ends of the arms 48 and collars 53, secured to the rods 49 a short distance from their upper ends. The purpose of these coil-springs 52 is to transmit pressure to the plates or holders 47 at the proper time, so as to clamp the veneer strips between the said plates 47 and the bottom of the chutes.

The vertical members of the bell-cranks 50 are connected by a rod or bar 54, so as to cause them to operate in unison. The vertical member of one of the bell-crank levers is extended and is slotted, as shown at 55, and engages with a pin or stud projecting laterally from an arm 57, secured at its lower end to the carriage 18, thereby imparting a vibratory movement to the bell-crank levers simultaneously with the reciprocating motion of the carriage 18. The parts are so disposed that when the carriage 18 is at a starting-point the bent ends 51 of the rods 49 are in engagement with the bent ends of the arms 48 and lift the plates 47, so as to release the strips of veneer and permit them to be fed forward to the cutting mechanism. The instant the carriage 18 advances so as to project the cutting mechanism across the path of the projecting ends of the strips 35 the bell-crank levers are actuated and through the springs 52 lower the plates 47 and cause them to clamp the veneer strips and hold them steady against the action of the cutting mechanism as the latter advances to its work and cuts the splints. When the carriage is returning to a starting-point and just prior to reaching its initial position, the levers 14, 12, and 42 are actuated so as to advance the strips of veneer a distance to bring a portion corresponding to the width of the match-splints in position to be cut off and move the holders forward, so as to receive the match-splints next cut.

The match-splint holders 58 are similarly formed, and each consists of a block 59 and side combs 60, attached at their lower ends to the sides of the block and having their toothed portions extending parallel. The match-splints are received between the teeth of the combs one after the other, and after one course of splints has been received in a holder a spacing-strip 61, of leather or other suitable material, is placed upon the layer of splints, and the next course is received thereon. This operation is repeated, a spacing-strip being interposed between each tier or course of splints, so as to properly space the latter. After the holder is filled a bar 62 is placed upon the topmost course of splints, and the latter are clamped by means of hooked bolts 63, the hooked ends entering openings in the ends of the block 59 and their threaded ends passing through openings in the end portions of the bar 62 and receiving clamp-nuts 64, by means of which the splints and spacing-strips are securely bound and held. The teeth of the combs are broad to properly space the splints, and their upper edges are beveled to provide flaring mouths or spaces to receive and direct the splints between the teeth. A carriage 65 is provided to receive a pair of splint-holders and has a longitudinal strip 66 of a height corresponding to the depth or thickness of the blocks 59, so as to admit of the top surfaces of the strips 66 and blocks 59 coming flush. Plates 67 are secured to the bottom side of each carriage, and their edge portions extend beyond the sides thereof to engage with the guide-strips 6, by means of which the carriages containing the holders are guided in their movements. Binding-screws 68 are let into threaded openings in the sides of each carriage and bear against the outer edges of the blocks 59 and clamp the latter against the strip 66 and secure the holders in place. Each veneer strip is of a width corresponding to the combined length of two match-splints, and the distance between the side pieces 69 of a carriage corresponds to the length of the double match-splints. After the holders of a carriage have been loaded they are removed from the carriage by loosening the binding-screws 68 and the splints treated in the usual way to render them combustible and self-igniting, after which the splints are divided and the prepared matches removed from the holders and packed in the usual way for the market.

In order to prevent the overfeeding of the veneer strips 35, stops 70 are located upon the bench 19 in the rear of the delivery ends of the chutes 33, and the ends of the strips abut against these stops, thereby insuring the splints being cut of uniform width.

In a full-sized machine the distance between the bottom of the chutes and the upper portion of the match-splint holders is not very great. Hence the splints when cut fall by the combined action of gravity and the impetus of the saws and are received between the teeth of the combs in the manner set forth. The space between the opposing portions of the bench and the chutes is such as to comfortably receive the splints and direct them vertically, and, as previously stated, the flaring space between the terminals of adjacent teeth will insure the splints coming between the teeth.

Having thus described the invention, what is claimed as new is—

1. In a machine for cutting match-splints, the combination of a chute or race for directing and supporting a strip of veneer, a cutting mechanism located to one side of the plane of the veneer strip, means for reciprocating the cutting mechanism transversely of the chute and across the veneer from one edge to the other, a match-splint holder on the opposite side of the plane of the veneer to the cutting mechanism, and a feeding mechanism for advancing the said match-splint holder to receive and bunch the splints, substantially as set forth.

2. In a machine for cutting match-splints, the combination of means for directing a strip of veneer to the cutting mechanism, a feeding mechanism for intermittently advancing the veneer, a cutting mechanism located to one side of the plane of the veneer strip, means for reciprocating the cutting mechanism transversely of the veneer from one edge to the other, a match-splint holder on the opposite side of the plane of the veneer to the cutting mechanism, and a feeding mechanism for the match-splint holder, substantially as set forth for the purpose described.

3. In a machine for cutting match-splints, the combination of a cutting mechanism, means for reciprocating the cutting mechanism transversely of the machine and across the veneer from one edge to the other, a feeding mechanism for intermittently advancing a strip of veneer to the cutting mechanism, a holder, mechanism for releasing the holder to admit of the veneer moving forward, and means for causing the holder to grip the veneer when advanced to secure it during the operation of the cutting mechanism, substantially as specified.

4. In a machine for cutting match-splints, the combination of a cutting mechanism, a feeding mechanism for intermittently advancing a strip of veneer to the cutting mechanism, means for reciprocating the cutting mechanism from one edge to the other of the veneer, a holder for gripping the veneer during the periods of inactivity of the feeding mechanism, mechanism controlled by the reciprocating carriage of the cutting mechanism for applying and releasing the holder, and a match-splint holder for receiving the splints, substantially as set forth.

5. In a machine for cutting match-splints, the combination of means for directing and intermittently feeding a strip of veneer, a cutting mechanism, means for reciprocating the cutting mechanism from one edge to the other of the veneer, a holder for clamping the veneer, a rod having loose connection with an arm or projecting portion of the holder, a spring for transmitting power from the rod to the said holder and engaging directly with the part through which the rod plays, and connections between the said rod and the reciprocating carriage bearing the cutting mechanism for alternately releasing and clamping the veneer, substantially as set forth.

6. In a machine for cutting match-splints, the combination of a reciprocating cutting mechanism, means for directing and feeding a strip of veneer to the cutting mechanism, a pivoted holder for clamping the veneer, an arm applied to the said holder, a rod operating loosely through the arm and having a limited upward movement to carry the holder away from the veneer, a spring for transmitting pressure from the rod to the pivoted holder and engaging directly with the said arm, and a lever having the aforesaid rod connected therewith and itself having connection with the reciprocating carriage bearing the cutting mechanism, substantially as and for the purpose specified.

7. In a match-splint-cutting machine, the combination of a reciprocating cutting mechanism, means for intermittently advancing a strip of veneer to the cutting mechanism, a pivoted holder for clamping the veneer, a rod operating loosely through an arm or projecting portion of the holder and having a stop at its lower end to engage positively with the said arm or projecting portion, a spring mounted upon the rod and adapted to transmit pressure therefrom to the said holder, a bell-crank lever having one arm connected with the aforesaid rod, and a loose and positive connection between the other arm of the lever and the reciprocating carriage bearing the cutting mechanism, substantially as set forth for the purpose described.

8. In a match-splint-cutting machine, the combination of a feeding mechanism for advancing a series of parallel strips of veneer, a reciprocating cutting mechanism, a series of holders for clamping the veneer strips, a rod having loose connection with each holder, a spring for transmitting pressure from each rod to its respective holder, bell-crank levers having one arm in connection with the said rods, and one of the said levers having its other arm extended and having loose and positive connection with the reciprocating carriage of the cutting mechanism, and means for connecting the bell-crank levers so as to cause them to operate in unison, substantially in the manner set forth for the purpose described.

9. In a match-splint-cutting machine, the combination of a reciprocating cutting mechanism, a chute, a pivoted frame located above the chute, a connected series of feed-rollers journaled to the pivoted frame and operating at intervals in the length of the chute for intermittently feeding a strip of veneer therethrough to the cutting mechanism, and actuating mechanism controlled by the carriage bearing the cutting mechanism for operating the series of feed-rollers and admitting of the pivoted frame turning to permit of the veneer being placed between it and the chute, substantially in the manner set forth.

10. In a match-splint-cutting machine, the combination of a reciprocating carriage bearing a cutting mechanism, a chute to receive the strip of veneer, a pivoted frame located above the chute and bearing a connected series of feed-rollers to bear upon and move the veneer strip through the chute, a toothed wheel secured to the shaft about which the pivoted frame turns, a lever bearing a pawl to coöperate with the toothed wheel, and a cam connected with the reciprocating carriage and engaging with the said lever for operating it and the connected series of feed-rollers, substantially as specified.

11. In a match-splint-cutting machine, the combination of a transversely-reciprocating carriage bearing a cutting mechanism, a chute, a pivoted frame, a connected series of feed-rollers supported at intervals in the length of the pivoted frame, a toothed wheel secured to the shaft in line with the axis of the pivoted frame, a lever bearing a pawl to coöperate with the toothed wheel, and an arm having pivotal connection with the reciprocating carriage and slidingly supported at its free end, and having a cam portion between its ends to engage with the lever for actuating the feed-rollers, substantially as specified.

12. In a match-splint-cutting machine, the combination of a transversely-reciprocating carriage bearing a circular saw, a feeding mechanism for intermittently advancing a strip of veneer to the saw actuated by means of the said carriage, a match-splint holder, and means for intermittently advancing the said holder to receive and bunch the match-splints and controlled by the power-transmitting mechanism of the aforesaid carriage, substantially in the manner set forth for the purpose described.

13. In a match-splint-cutting machine, the combination of a cutting mechanism, parallel chutes, a pivoted frame, a series of parallel shafts journaled to the frame and provided with feed-rollers to coöperate with the chutes, band-pulleys secured to the said parallel shafts and connected so as to rotate in unison, a toothed wheel applied to the shaft coincident with the pivoted end of the frame, a lever bearing a pawl to coöperate with the said toothed wheel, and a reciprocating arm having a cam portion for operating the said lever and having connection with the frame of the cutting mechanism, substantially as and for the purpose set forth.

14. A match-splint holder comprising a bar, combs attached thereto, spacing-strips to be interposed between the courses of splints, a bar having its end portions apertured, hooked bolts having their bent ends engaging with openings in the ends of the base of the holder and having their threaded ends passing through the openings of the clamp-bar, and clamp-nuts mounted upon the threaded extremities of the hooked bolts, substantially as set forth.

15. In combination, a carriage, splint-holders placed within the carriage and spaced apart, and binding-screws let into threaded openings in the sides of the carriage for securing the splint-holders in place, substantially as set forth.

16. In combination, a carriage having a longitudinal strip on the top side of its bottom intermediate of the side pieces, splint-holders located within the carriage upon opposite sides of the said longitudinal strip, and binding-screws let into the sides of the carriage for securing the holders therein, substantially as set forth.

In testimony that I claim the foregoing as my own I have hereto affixed my signature in the presence of two witnesses.

JOSEPH A. BEAMISDERFER.

Witnesses:
FRANK E. MEILY,
JOHN LIGHT.